(12) United States Patent
Han et al.

(10) Patent No.: US 11,995,436 B2
(45) Date of Patent: May 28, 2024

(54) OUT-OF-BAND UPDATING METHOD AND SYSTEM OF EXPANDER

(71) Applicant: Inspur Electronic Information Industry Co., Ltd., Shandong (CN)

(72) Inventors: Hongrui Han, Shandong (CN); Leijun Hu, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/768,155

(22) PCT Filed: Jan. 21, 2020

(86) PCT No.: PCT/CN2020/073401
§ 371 (c)(1),
(2) Date: Apr. 11, 2022

(87) PCT Pub. No.: WO2021/103309
PCT Pub. Date: Jun. 3, 2021

(65) Prior Publication Data
US 2024/0095019 A1    Mar. 21, 2024

(30) Foreign Application Priority Data
Nov. 29, 2019  (CN) .......................... 201911207219.8

(51) Int. Cl.
*G06F 21/57*  (2013.01)
*G06F 1/3234*  (2019.01)
(Continued)

(52) U.S. Cl.
CPC ............ *G06F 8/654* (2018.02); *G06F 1/3268* (2013.01); *G06F 11/1004* (2013.01); *G06F 13/4022* (2013.01); *G06F 3/0628* (2013.01)

(58) Field of Classification Search
CPC ...... G06F 1/3268; G06F 3/0628; G06F 8/654; G06F 11/1004; G06F 13/4022; G06F 3/0685
See application file for complete search history.

(56) References Cited

U.S. PATENT DOCUMENTS

| 11,494,109 B1 * | 11/2022 | Sears ..................... G06F 3/0685 |
| 2005/0005178 A1 * | 1/2005 | Bashford .............. G06F 1/3268 713/320 |
| 2014/0289437 A1 * | 9/2014 | Myrah .................. G06F 3/0628 710/261 |

OTHER PUBLICATIONS

David Kenji, AU 2005202940, Feb. 2, 2006, 11pgs <AU_2005202940.pdf>.*

(Continued)

*Primary Examiner* — Tuan A Vu
(74) *Attorney, Agent, or Firm* — Dinsmore & Shohl LLP

(57) ABSTRACT

An out-of-band updating method and system of an Expander, applied to a controller connected to the expander by means of a communication bus. The method comprises: receiving firmware updating data sent by a user (S101); fragmenting the firmware updating data (S102); and only when determining that the expander is in an idle state, sending the fragmented data until each piece of data is sent to the Expander, such that the expander completely receiving the firmware updating data completes updating by restarting (S103). The data transmission speed is facilitated to be improved, the normal operation of a service is ensured, and the conditions of influencing state monitoring and log loss are avoided.

14 Claims, 3 Drawing Sheets

(51) Int. Cl.
*G06F 8/654* (2018.01)
*G06F 11/10* (2006.01)
*G06F 13/40* (2006.01)
*G06F 3/06* (2006.01)

(56) References Cited

OTHER PUBLICATIONS

Leggette et al, CN 104106055, (translation), Dec. 28, 2016, 56 pgs <CN_104106055.pdf>.*

* cited by examiner

OUT-OF-BAND UPDATING METHOD AND SYSTEM OF EXPANDER

CROSS-REFERENCE TO RELATED APPLICATIONS

This application is a § 371 National Stage Entry of International Application Serial No. PCT/CN2020/073401, filed Jan. 21, 2020, and claims priority to Chinese Patent Application No. 201911207219.8, entitled "EXPANDER OUT-OF-BAND UPDATE METHOD AND SYSTEM" and filed with the Chinese Patent Office on Nov. 29, 2019, the entire contents of which are incorporated herein by reference.

TECHNICAL FIELD

The present disclosure relates to the field of storage technologies, and in particular, to an expander out-of-band update method and system.

BACKGROUND

With the rapid development of cloud computing centers, cloud storage and big data, users have increasingly high requirements on storage performance and management convenience of servers. With the development of a pooling technology, it is increasingly widely used to integrate a large number of hard disks for centralized management by expansion using an SAS Expander.

There are two firmware upgrades for an Expander: out-of-band upgrade and in-band upgrade. The in-band upgrade through an SAS bus has the advantages of a high speed and no impact on user services. However, the in-band upgrade is required to be implemented based on users' operating systems. As more and more storage resources are available in cloud computing and cloud storage, different hard disks may be allocated to different customers, and users pay more and more attention to data security. Therefore, more and more customers are not allowed to use the in-band upgrade.

The out-of-band upgrade is more secure. At present, the upgrade is generally performed based on a Debug serial port of an Expander; in addition to the fact that a need to remove a chassis causes inconvenience in operation and maintenance, on the one hand, a low rate of the serial port leads to a low data transmission speed and long upgrade time; on the other hand, the bus may be blocked to some extent. Therefore, services maybe seriously impacted during the firmware upgrade. Moreover, the serial port is occupied during the upgrade, and therefore, in some cases, state monitoring of the serial port may be affected, resulting in log losses.

Based on the above, how to effectively increase the data transmission speed and reduce the blockage of the bus to ensure the normal operation of services, so as to prevent the log losses caused by the influence on state monitoring is an urgent technical problem to be solved currently by those skilled in the art.

SUMMARY

An objective of the present disclosure is to provide an expander out-of-band update method and system to effectively increase the data transmission speed and reduce the blockage of the bus to ensure the normal operation of services, so as to prevent log losses caused by the influence on state monitoring.

In order to solve the above technical problems, the present disclosure provides the following technical solutions.

An expander out-of-band update method, applied to a controller connected to an expander through a communication bus, the method including:
  receiving firmware update data sent by a user;
  fragmenting the firmware update data; and
  sending the fragmented data only when it is determined that the expander is in an idle state until each data fragment is sent to the Expander, so that the expander receiving the firmware update data completes an update through a restart.

Preferably, the step of sending the fragmented data only when the expander is in an idle state includes:
  determining that the expander is in the idle state when continuous utilization of a CPU of the expander is lower than a first threshold, and sending the fragmented data only when it is determined that the expander is in the idle state.

Preferably, the step of sending the fragmented data only when the expander is in an idle state includes:
  determining that the expander is in the idle state when bus utilization of the communication bus is lower than a second threshold, and sending the fragmented data only when it is determined that the expander is in the idle state.

Preferably, the step of fragmenting the firmware update data including: acquiring an average bus interval time, and determining a fragment size
  corresponding to the average bus interval time according to a preset corresponding relationship; and
  fragmenting the firmware update data, a size of each data fragment being equal to the determined fragment size;
  wherein the fragment size in the corresponding relationship is positively
  correlated with the average bus interval time.

Preferably, the fragment size in the corresponding relationship is equal to a product of the average bus interval time and a data transmission rate of the communication bus.

Preferably, the step of fragmenting the firmware update data including:
  acquiring an average bus interval time, and determining a fragment size corresponding to the currently acquired average bus interval time according to a preset corresponding relationship;
  updating the average bus interval time and the corresponding fragment size according to a preset first time interval; and
  fragmenting the firmware update data according to a preset second time interval, during each fragmentation, a size of the data fragment being equal to the currently determined fragment size;
  wherein the fragment size in the corresponding relationship is positively correlated with the average bus interval time.

Preferably, subsequent to the step of receiving firmware update data sent by a user, the method further includes:
  acquiring an upgrade mode;
  performing the operation of fragmenting the firmware update data when the acquired upgrade mode is an idle upgrade mode; and
  performing an upgrade process based on continuous sending of the firmware update data when the acquired upgrade mode is a continuous upgrade mode.

Preferably, subsequent to the step of receiving firmware update data sent by a user, the method further includes:
  compressing the received firmware update data; and correspondingly, the step of fragmenting the firmware update data including:
fragmenting the compressed firmware update data.

Preferably, the method further includes:
adding a check value for each data fragment after fragmentation, so that the Expander, after receiving any data fragment, feeds check failure of the data fragment back to the controller for resending the data fragment.

Preferably, the firmware update data further carries integrity check information; and
correspondingly, subsequent to the step of receiving firmware update data sent by a user, the method further includes:
checking the received firmware update data through the integrity check information, and terminating the upgrade process when the check fails.

Preferably, the firmware update data further carries validity check information and version applicable-scope information; and
correspondingly, subsequent to the step of receiving firmware update data sent by a user, the method further includes:
acquiring attribute parameter information and version information of the Expander; and
terminating the upgrade process when the acquired attribute parameter information of the expander does not conform to the validity check information or the acquired version information of the expander does not conform to the version applicable-scope information.

Preferably, the step of sending the fragmented data only when it is determined that the expander is in an idle state until each data fragment is sent to the Expander, so that the expander receiving the firmware update data completes an update through a restart includes:
sending the fragmented data only when it is determined that the expander is in the idle state until each data fragment is sent to the Expander, so that the expander receiving the firmware update data completes the update through the restart after receiving a restart command.

Preferably, subsequent to the step of fragmenting the firmware update data, the method further includes:
generating a corresponding unique check value for each data fragment according to a preset algorithm;
acquiring each unique check value stored during a previous out-of-band update of the Expander; and
for each unique check value generated this time, when the unique check value is the same as any unique check value stored, canceling the sending of a data fragment corresponding to the unique check value and sending event information to the Expander.

Preferably, the controller is connected to a plurality of Expanders, so as to update the connected Expanders in batches in a one-by-one update or broadcast update manner after the firmware update data is received.

An expander out-of-band update system, applied to a controller connected to an expander through a communication bus, the system including:
a firmware update data receiving module configured to receive firmware update data sent by a user;
a data fragmentation module configured to fragment the firmware update data; and
a fragment transmission module configured to send the fragmented data only when it is determined that the expander is in an idle state until each data fragment is sent to the Expander, so that the expander receiving the firmware update data completes an update through a restart.

The technical solutions according to the embodiments of the present disclosure are applied to a controller connected to an expander through a communication bus, and an out-of-band update of the expander is realized through the controller without the use of a serial port. Moreover, since a data transmission speed of the communication bus is higher than that of the serial port, the update is sped up and data transmission time is shortened. Further, firmware update data is fragmented, and the fragmented data is sent only when it is determined that the expander is in an idle state, so that original services of the expander may not be affected during the receiving of the firmware update data by the Expander. Moreover, since the fragmented data is sent only when it is determined that the expander is in the idle state, the solutions according to the present application may prevent log losses caused by the influence on state monitoring of the expander no matter whether state monitoring and log transmission are realized through the serial port. Based on the above, the solutions according to the present application help increase the data transmission speed, ensure the normal operation of services, and prevent log losses caused by the influence on state monitoring.

BRIEF DESCRIPTION OF DRAWINGS

In order to more clearly illustrate the technical solutions in embodiments of the present disclosure or the prior art, the accompanying drawings used in the description of the embodiments or the prior art will be briefly introduced below. It is apparent that the accompanying drawings in the following description are only some embodiments of the present disclosure, and other drawings can be obtained by those of ordinary skill in the art from the provided drawings without creative efforts.

DESCRIPTION OF EMBODIMENTS

The core of the present disclosure is to provide an expander out-of-band update method to help increase a data transmission speed and ensure the normal operation of services, so as to prevent log losses caused by the influence on state monitoring.

In order to make those skilled in the art better understand the solutions of the present disclosure, the following is a further detailed description of the present disclosure with reference to the accompanying drawings and specific implementations. Obviously, the described embodiments are only some of rather than all of the embodiments of the present disclosure. Based on the embodiments of the present disclosure, all other embodiments obtained by those of ordinary skill in the art without creative efforts fall within the protection scope of the present disclosure.

Figure 1:
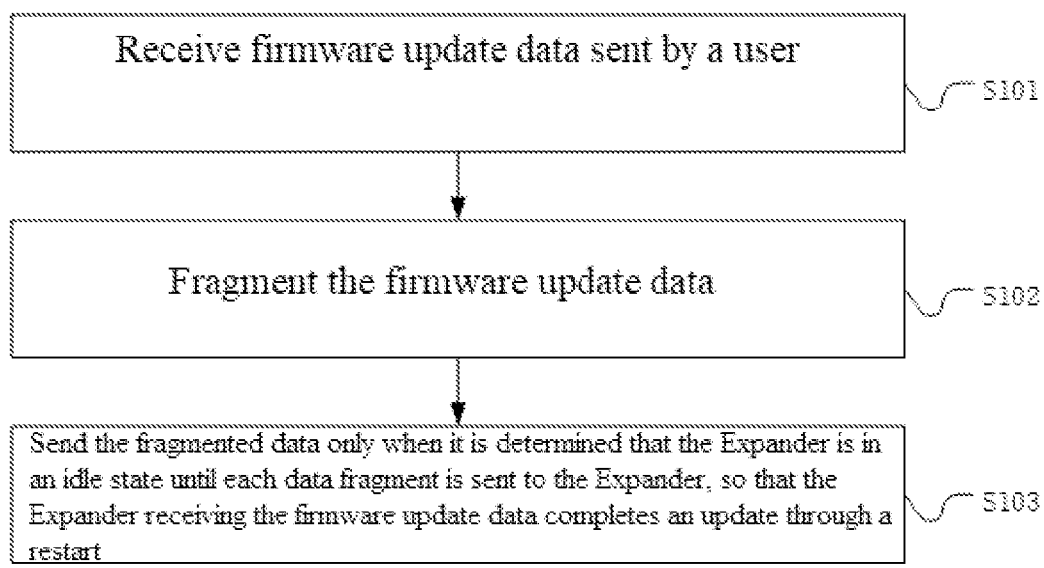
FIG. 1 is a flowchart of implementation of an expander out-of-band update method according to the present disclosure.
Figure 2:
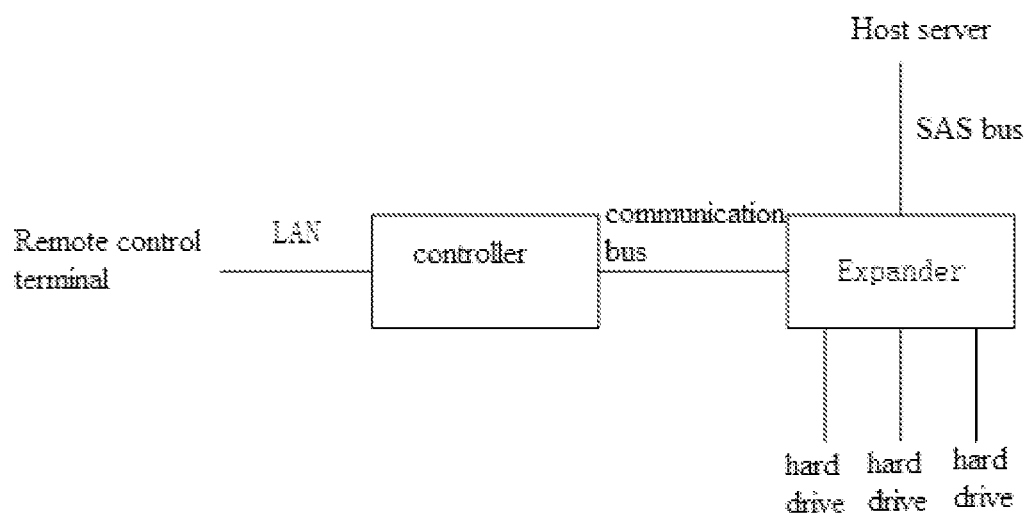
FIG. 2 is a schematic structural diagram of a connection between an expander and a controller according to the present disclosure.

Referring to FIG. 1, FIG. 1 is a flowchart of implementation of an expander out-of-band update method according to the present disclosure, and referring to FIG. 2, the expander out-of-band update method may be applied to a controller connected to an expander through a communication bus. The expander out-of-band update method may include the following steps.

In step S101, firmware update data sent by a user is received.

In an implementation of FIG. 2, the controller may receive the firmware update data sent by the user through a remote control terminal, and the controller receives the firmware update data based on Local Area Network (LAN) communication. Through the LAN, the user may remotely send the firmware update data to the controller. That is, the user may realize an expander out-of-band update through remote operations, which improves the convenience of a firmware update.

Certainly, in other implementations, it may be based on other types of wireless communication, or wired communication, such as an RS232 or I2C interface, provided that the controller can receive the firmware update data, which does not affect the implementation of the present disclosure.

The type of the controller may be set and selected according to an actual requirement, which may be selected as, for example, an ARM controller or a PSOC controller. In a specific implementation of the present disclosure, considering that a BMC is provided in some cases to be connected to the Expander, the BMC may be directly used as the controller of the present application. Using the BMC as the controller in the present application is more cost-effective than arranging an additional controller.

In practical applications, the BMC may be provided to communicate with the expander to transmit information such as commands, states, data, fault alarms and logs. The BMC may also send received control and query commands sent by a customer to the Expander, and acquire relevant feedback data from the expander to return the relevant feedback data to the customer. The BMC may also periodically perform queries and data records of information such as asset information, system states and disk states of the Expander, and periodically collect information such as logs and fault alarms of the expander for storage and reporting. In addition, the expander may also exchange data with a host server through an SAS bus.

That is, constant data communication exists between the expander and the host server as well as between the expander and the BMC. Such communication cannot be delayed for too long. Therefore, when the controller uses the communication bus connected to the expander to achieve the firmware upgrade of the present application, the original services of the expander should not be greatly affected, no matter whether the additional controller is provided or the BMC is selected as the controller of the present application.

A specific type of the communication bus between the controller and the expander may be set and selected based on an actual condition. However, it is understandable that the communication bus with a high communication rate is generally selected to shorten the upgrade time. For example, the communication bus may be selected as any one of an I2C bus, an SPI bus and an I3C bus. Such communication buses have the high communication rate. In practical applications, the BMC is generally selected as the controller of the present application, and the expander may also be generally provided with the I2C interface. Therefore, in practical applications, the communication bus between the controller and the expander may be generally selected as the I2C bus. The I2C bus typically has a rate up to 400 Kbps, which is much higher than that of a Debug serial port of the Expander.

In step S102, the firmware update data is fragmented.

It is understandable that, in a few cases, a continuous upgrade mode may be adopted, considering that no services run on the expander or the user does not care about the influence of the firmware upgrade on the running of the services.

Specifically, in a specific implementation of the present disclosure, subsequent to step S101, the method may further include the following steps:

acquiring an upgrade mode;
performing the operation of step S102 when the acquired upgrade mode is an idle upgrade mode; and
performing an upgrade process based on continuous sending of the firmware update data when the acquired upgrade mode is a continuous upgrade mode.

The continuous upgrade mode is similar to the conventional solution. That is, after receiving the firmware update data from the user, the controller may continuously send the firmware update data to the expander without considering the influence of the firmware upgrade on the services if the continuous upgrade mode is determined. After receiving all the firmware update data, the expander restarts immediately to complete the upgrade.

The solution of the present application may support two modes at the same time. In practical applications, the user may select the continuous upgrade mode or the idle upgrade mode as required. Specifically, the mode may be switched through a relevant command, which may generally be the idle upgrade mode by default. Certainly, in some cases, only one mode, that is, only the idle upgrade mode, may be set. In this way, mode judgment is not required. After the firmware update data sent by the user is received, the operation of step S102 may be directly performed.

After the upgrade mode is determined as the idle upgrade mode, the firmware upgrade is required not to affect the running of the original services of the Expander. Therefore, the firmware update data may be fragmented in the present application. That is, the firmware upgrade data is segmented to obtain a plurality of pieces of data.

Generally, when the firmware update data is fragmented, a unique corresponding number is added for each data fragment, so that out-of-order transmission may be supported when the fragmented data is transmitted to the Expander. The expander may determine, according to the number, the part of the original firmware update data to which each received data fragment belongs.

The firmware update data, when fragmented, is typically divided into a preset size. For example, according to actual experience, each data fragment is divided into 256 bytes. Further, in some implementations, in order to make full use of the bus, the operation of step S102 may specifically include the following two steps.

In step one, an average bus interval time is acquired, and a fragment size corresponding to the average bus interval time is determined according to a preset corresponding relationship.

In step two, the firmware update data is fragmented, and a size of each data fragment is equal to the determined fragment size.

The fragment size in the corresponding relationship is positively correlated with the average bus interval time.

In this implementation, the corresponding relationship between the average bus interval time and the fragment size is preset, and the two are positively correlated. Understandably, the shorter the average bus interval time is, the more frequently the data is transmitted on the bus, that is, the busier the bus is. Conversely, the longer the average bus interval time, the more idle the bus. The longer the average bus interval time, the larger the fragment size selected. In this way, compared with simply presetting a fixed fragment size, in this implementation, the corresponding fragment size is determined based on the acquired average bus interval time, which is conducive to making full use of the bus and shortening the total time of the expander out-of-band update.

In addition, it is also to be noted that, in practical applications, a specific value of the fragment size in the corresponding relationship may generally be determined by combining the average bus interval time and the data transmission rate of the communication bus. For example, the fragment size in the corresponding relationship may be equal to a product of the average bus interval time and the data transmission rate of the communication bus. In this way, complicated calculation is not required, which is convenient for the implementation of the solution, and the fragment size is more appropriate. Certainly, other selection manners are also available in other implementations. For example, after the product is determined, the fragment size may be slightly lower than the product to leave a certain margin, which prevents a situation that the running of the services of the expander may be affected when the services of the expander change greatly.

Further, in a specific implementation of the present disclosure, step S102 may specifically include the following three steps.

In the first step, an average bus interval time is acquired, and a fragment size corresponding to the currently acquired average bus interval time is determined according to a preset corresponding relationship.

In the second step, the average bus interval time and the corresponding fragment size are updated according to a preset first time interval.

In the third step, the firmware update data is fragmented according to a preset second time interval, and during each fragmentation, a size of the data fragment is equal to the currently determined fragment size.

The fragment size in the corresponding relationship is positively correlated with the average bus interval time.

In this implementation, the corresponding fragment size is determined based on the average bus interval time, and the average bus interval time and the corresponding fragment size may also be periodically updated, considering that it is a continuous process to fragment the firmware update data. The services of the expander may change constantly, and therefore, in order to enable the determined fragment size to be more in line with a current actual situation, so as to make full use of the bus. In this implementation, the average bus interval time and the corresponding fragment size may be updated according to the preset first time interval. For example, at a first moment, the average bus interval time determined is 100 ms, and the fragment size is determined as 256 bytes according to the preset corresponding relationship. After the first time interval, the average bus interval time determined changes to 300 ms due to a change in the services of the Expander. Then, according to the preset corresponding relationship, for example, the fragment size determined changes to 512 bytes.

In this implementation, the firmware update data may be fragmented according to the preset second time interval, and each time the fragmentation is triggered, a size of the data fragment is equal to the currently determined fragment size. For example, if the currently determined fragment size is 256 bytes, data of 256 bytes is obtained from the firmware update data by fragmentation as a data fragment, which is referred to as, for example, a first data fragment. After the second time interval, if the determined fragment size is, for example, still 256 bytes and is not updated, data of 256 bytes is obtained from the firmware update data by fragmentation as a data fragment, which is referred to as, for example, a second data fragment. After another second time interval, if the determined fragment size changes to, for example, 512 bytes, data of 512 bytes is obtained from the firmware update data by fragmentation as a data fragment, which is referred to as, for example, a third data fragment. As can be seen, periodically updating the average bus interval time and the corresponding fragment size is helpful to make the determined fragment size more in line with the current actual situation, so as to make full use of the bus.

Specific values of the first time interval and the second time interval may also be set and adjusted according to an actual requirement.

In step S103, the fragmented data is sent only when it is determined that the expander is in an idle state until each data fragment is sent to the Expander, so that the expander receiving the firmware update data completes an update through a restart.

Specifically, for example, there are 20 data fragments in total. When it is determined that the expander is in the idle state at a moment A, sending of data begins. For example, after the first data fragment and the second data fragment are sent and the expander switches to a non-idle state, the sending process may be suspended. Next time it is determined that the expander is in the idle state, the third data fragment may be sent until the 20 data fragments are all successfully sent to the Expander.

Certainly, if the expander switches from the idle state to the non-idle state during the sending of a certain data fragment, the sending of the data fragment may not be stopped. Therefore, when the firmware update data is fragmented, the size of each data fragment may be set and adjusted according to an actual situation. However, the size should generally not be too large, so as to prevent the special situation. For example, if the size of each data fragment is 256 bytes, the transmission time of one data fragment is less than 1 ms. In another example, the size of each data fragment is 1 Kbyte or the like.

Further, in a specific implementation of the present disclosure, subsequent to step S102, the method may further include the following steps:

generating a corresponding unique check value for each data fragment according to a preset algorithm;

acquiring each unique check value stored during a previous out-of-band update of the Expander; and for each unique check value generated this time, when the unique check value is the same as any unique check value stored, canceling the sending of a data fragment corresponding to the unique check value and sending event information to the Expander.

This implementation helps reduce the amount of data to be transmitted, shorten the data transmission time, and further reduce the influence of the firmware update on the services of the Expander.

Specifically, for example, after the firmware update data is fragmented, the 20 data fragments are obtained. A corresponding unique check value is required to be generated for each data fragment according to the preset algorithm. For example, a hash value may be generated. Certainly, other forms of unique check values may be used in other implementations.

Then, each unique check value stored during a previous out-of-band update of the expander is acquired. For example, unique check values respectively corresponding to the 20 data fragments are sequentially expressed as 00A, 00B, 00C, 00D, . . . , 00R, 00S and 00T. For example, for the unique check value 00A, if the acquired unique check values stored during a previous out-of-band update of the expander are 00A, 11B, 01C, 00U, 00V and 00W, the data fragment corresponding to 00A in this firmware update is the same as the data fragment in the previous firmware update since they have the same unique check value 00A. Therefore, the sending of the data fragment corresponding to the unique check value 00A may be canceled, and event information is sent to the Expander, so that the expander replaces the unsent data fragment with the data fragment stored after the previous update. That is, through the sending of the event information, the expander is informed to use original data.

It is understandable that, in this implementation, each time the firmware of the expander is updated, each unique check value generated is required to be stored. Moreover, no unique check value has been stored during the first execution, and therefore, the sending of a certain data fragment may not be canceled during the first operation.

A condition for judging whether the expander is in the idle state may be set and adjusted according to an actual requirement. However, it is understandable that the condition is required to be set so that when the condition is established, the expander is in a relatively idle state, so that the controller uses the communication bus to send data related to the firmware upgrade without affecting the original services of the Expander.

In a specific implementation of the present disclosure, considering that the BMC is generally used as the controller, for the convenience of description, it is assumed that the BMC is connected to the expander through an I2C bus. When the bus utilization of the I2C bus is high, it generally indicates that the services of the expander are busy. Correspondingly, if the bus utilization of the I2C bus is low, it generally indicates that the expander has fewer services. That is, the expander is in the relatively idle state. Therefore, in a specific implementation of the present disclosure, sending the fragmented data only when it is determined that the expander is in an idle state described in step S103 may specifically include: determining that the expander is in the idle state when bus utilization of the communication bus is lower than a second threshold, and sending the fragmented data only when it is determined that the expander is in the idle state.

A specific value of the second threshold may be set and adjusted as required, which is set to, for example, 60%. When the bus utilization of the communication bus is lower than 40%, it indicates that a large amount of idle interval time exists on the communication bus. In this case, data related to the firmware upgrade may be transmitted to prevent exclusive occupation of the bus, and the expander is generally in the idle state.

It is to be noted that, in the preceding example, whether the expander is in the idle state is judged by using the bus utilization of the communication bus. This is easy to implement and can ensure that the firmware upgrade does not affect the communication between the BMC and the Expander. However, such a solution is generally applied to a situation where the controller is the BMC, which may still affect the services of the expander in a few cases. That is, in a few cases, the communication between the expander and the BMC is not frequent, but the communication between the expander and the host server is frequent, so that the expander is busy.

Therefore, in a specific implementation of the present disclosure, in order to more accurately ensure that the expander is in the relatively idle state, sending the fragmented data only when the expander is in an idle state described in step S103 specifically includes: determining that the expander is in the idle state when continuous utilization of a CPU of the expander is lower than a first threshold, and sending the fragmented data only when it is determined that the expander is in the idle state.

In the implementation, considering that the communication between the expander and the BMC or the communication between the expander and the host server is reflected in the continuous utilization of the CPU to some extent, the expander is determined to be in the idle state when the continuous utilization of the CPU of the expander is lower than the first threshold. The implementation helps more accurately determine that the expander is in the idle state. The value of the first threshold may be set and adjusted as required, which is set to, for example, 50%.

Certainly, in practical applications, the continuous utilization of the CPU of the expander and the bus utilization of the communication bus between the controller and the expander may also be judged at the same time. For example, in a specific situation, the expander is determined to be in the idle state only when the continuous utilization of the CPU of the expander is lower than the first threshold and the bus utilization of the communication bus is lower than the second threshold, which is conducive to further strengthening the guarantee of the running of the services of the Expander.

The technical solutions according to the embodiments of the present disclosure are applied to a controller connected to an expander through a communication bus, and an out-of-band update of the expander is realized through the controller without the use of a serial port. Moreover, since a data transmission speed of the communication bus is higher than that of the serial port, the update is sped up and data transmission time is shortened. Further, firmware update data is fragmented, and the fragmented data is sent only when it is determined that the expander is in an idle state, so that original services of the expander may not be affected during the receiving of the firmware update data by the Expander. Moreover, since the fragmented data is sent only when it is determined that the expander is in the idle state, the solutions according to the present application may prevent log losses caused by the influence on state monitoring of the expander no matter whether state monitoring and log transmission are realized through the serial port. Based on the above, the solutions according to the present application help increase the data transmission speed, ensure the normal operation of services, and prevent log losses caused by the influence on state monitoring.

In a specific implementation of the present disclosure, subsequent to step S101, the method may further include:
compressing the received firmware update data.
Correspondingly, fragmenting the firmware update data described in step S102 includes:
fragmenting the compressed firmware update data.

After analyzing the firmware update data, the applicant finds a large number of duplicate data and data filled with 0, with a high compression rate. Therefore, the received firmware update data is compressed, so as to help further shorten the upgrade time.

It is understandable that the firmware update data is compressed in the implementation, so fragmenting the data in step S102 is fragmenting the compressed firmware update data.

A specific compression algorithm may be selected according to an actual condition. For example, a QuickLZ compression algorithm is an open-source, lightweight, pure C implementation, simple, efficient and fast compression algorithm. After experimental verification, the firmware update data may be compressed to 20% of the original volume.

After being received by the Expander, each compressed data fragment may be decompressed and restored, and may be then written to a Flash. The firmware is updated after a restart.

Further, in a specific implementation of the present disclosure, the method may further include:

adding a check value for each data fragment after fragmentation, so that the Expander, after receiving any data fragment, feeds check failure of the data fragment back to the controller for resending the data fragment.

The form of the check value may be set and adjusted according to an actual requirement. For example, a relatively simple, widely used CRC check value may be used. For any data fragment, CRC check may be performed first after the data is received by the Expander, and the data is stored in a corresponding region after the check is successful. Correspondingly, if the check fails, a feedback signal may be sent to require the controller to resend the data. For example, the feedback signal may carry a serial number of the data fragment failing in check and require the controller to resend the data.

In a specific implementation of the present disclosure, the firmware update data further carries integrity check information.

Correspondingly, subsequent to step S101, the method may further include:

checking the received firmware update data through the integrity check information, and terminating the upgrade process when the check fails.

In the above embodiment, a check value is added for each data fragment to help ensure that the expander receives the correct firmware update data. In this implementation, considering that data errors may occur when the user sends the firmware update data to the controller, the controller, after receiving the firmware update data, may check the received firmware update data through the integrity check information carried in the firmware update data. If the check fails, the upgrade process may be terminated to prevent the upgrade based on incorrect data. Certainly, corresponding feedback information may also be sent to the user. For example, prompt information is sent to a remote control terminal over the LAN to show that the integrity of the received firmware update data is faulty, so as to trigger a corresponding measure such as resending of the data.

The specific form of the integrity check information may also be set and selected as required, such as MD5 code, CRC or a hash value.

In a specific implementation of the present disclosure, the firmware update data further carries validity check information and version applicable-scope information.

Correspondingly, subsequent to step S101, the method may further include:

acquiring attribute parameter information and version information of the Expander; and terminating the upgrade process when the acquired attribute parameter information of the expander does not conform to the validity check information or the acquired version information of the expander does not conform to the version applicable-scope information.

Validity verification may be performed on the attribute parameter information of the Expander. Specifically, the attribute parameter information may include information such as a model of the Expander. When the attribute parameter information of the expander conforms to the validity check information, it indicates that the current expander is adapted to the firmware update data; otherwise, it indicates that the current expander is not adapted to the firmware update data, and the upgrade process may be terminated. Certainly, related prompt information may also be outputted. For example, prompt information is sent to the remote control terminal to show that there is a problem with adaptability.

Correspondingly, if the version information of the expander does not conform to the version applicable-scope information, indicating that an upgrade condition is not met, the upgrade process may be terminated and the corresponding prompt information may be outputted. For example, the version applicable-scope information carries the following content: the firmware update data is applied to upgrades later than V1.3. If the version information of the expander is lower than V1.3, it indicates the version information of the expander does not conform to the version applicable-scope information.

In a specific implementation of the present disclosure, step S103 may specifically include:

sending the fragmented data only when it is determined that the expander is in the idle state until each data fragment is sent to the Expander, so that the expander receiving the firmware update data completes an update through a restart after receiving a restart command.

In the implementation, after receiving the firmware update data, the expander can complete the update through the restart only after receiving the restart command. The restart command may generally be sent by the user, that is, the user may determine when to restart, which helps meet actual user requirements and enables an offline update.

In a specific implementation of the present disclosure, the controller is connected to a plurality of Expanders, so as to update the connected Expanders in batches in a one-by-one update or broadcast update manner after the firmware update data is received. Specifically, the controller receives the firmware update data and may update, in batches, Expanders within its jurisdiction, that is, connected thereto. Certainly, for each Expander, it may also be judged whether the attribute parameter information conforms to the validity check information and then it is judged whether the version information conforms to the version applicable-scope information as in the above implementation. The batch upgrade is adopted in this implementation, which helps reduce the workload of users. The batch update may be performed in a one-by-one update or broadcast update manner, which improves the application scope of the solution.

Corresponding to the method embodiment above, an embodiment of the present application further provides an expander out-of-band update system applied to a controller connected to an expander through a communication bus, which may be cross-referenced with the above.

Figure 3:
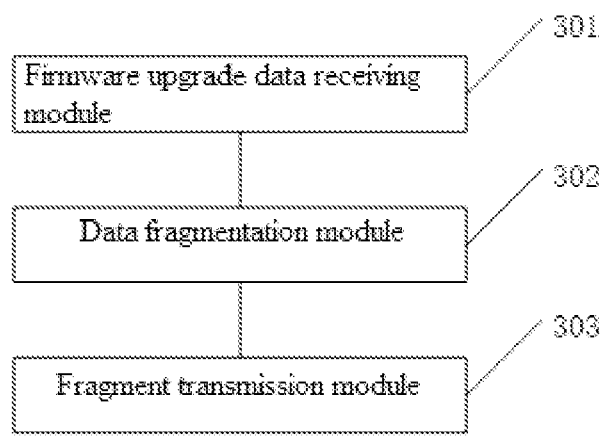
FIG. 3 is a schematic structural diagram of an expander out-of-band update system according to the present disclosure.

Referring to FIG. 3 which is a schematic structural diagram of an expander out-of-band update system according to the present disclosure, the system may include the following modules.

A firmware update data receiving module 301 is configured to receive firmware update data sent by a user.

A data fragmentation module 302 is configured to fragment the firmware update data.

A fragment transmission module 303 is configured to send the fragmented data only when it is determined that the expander is in an idle state until each data fragment is sent to the Expander, so that the expander receiving the firmware update data completes an update through a restart.

In a specific implementation of the present disclosure, the fragment transmission module 303 is specifically configured to:

determine that the expander is in the idle state when continuous utilization of a CPU of the expander is lower than a first threshold, and send the fragmented data only when it is determined that the expander is in the idle state until each data fragment is sent to the Expander, so that the expander receiving the firmware update data completes the update through the restart.

In a specific implementation of the present disclosure, the fragment transmission module 303 is specifically configured to:

determine that the expander is in the idle state when bus utilization of the communication bus is lower than a second threshold, and send the fragmented data only when it is determined that the expander is in the idle state until each data fragment is sent to the Expander, so that the expander receiving the firmware update data completes the update through the restart.

In a specific implementation of the present disclosure, the communication bus is any one of an I2C bus, an SPI bus and an I3C bus.

In a specific implementation of the present disclosure, the data fragmentation module 302 is specifically configured to:

acquire an average bus interval time, and determine a fragment size corresponding to the average bus interval time according to a preset corresponding relationship; and fragment the firmware update data, a size of each data fragment being equal to the determined fragment size;

wherein the fragment size in the corresponding relationship is positively correlated with the average bus interval time.

In a specific implementation of the present disclosure, the data fragmentation module 302 is specifically configured to:

acquire an average bus interval time, and determine a fragment size corresponding to the currently acquired average bus interval time according to a preset corresponding relationship;

update the average bus interval time and the corresponding fragment size according to a preset first time interval; and fragment the firmware update data according to a preset second time interval, during each fragmentation, a size of the data fragment being equal to the currently determined fragment size;

wherein the fragment size in the corresponding relationship is positively correlated with the average bus interval time.

In a specific implementation of the present disclosure, the system further includes:

an upgrade mode selection module configured to acquire an upgrade mode, and when the acquired upgrade mode is an idle upgrade mode, trigger the data fragmentation module 302; and when the acquired upgrade mode is a continuous upgrade mode, perform an upgrade process based on continuous sending of the firmware update data.

In a specific implementation of the present disclosure, the system further includes:

a compression module configured to compress the received firmware update data.

Correspondingly, the data fragmentation module 302 is specifically configured to:

fragment the compressed firmware update data after the upgrade mode is determined as the idle upgrade mode.

In a specific implementation of the present disclosure, the system further includes:

a fragmented data check module configured to add a check value for each data fragment after fragmentation, so that the Expander, after receiving any data fragment, feeds check failure of the data fragment back to the controller for resending the data fragment.

In a specific implementation of the present disclosure, the firmware update data further carries integrity check information.

Correspondingly, the system further includes:

a first check module configured to check the received firmware update data through the integrity check information, and terminate the upgrade process when the check fails.

In a specific implementation of the present disclosure, the firmware update data further carries validity check information and version applicable-scope information.

Correspondingly, the system further includes:

a second check module configured to acquire attribute parameter information and version information of the Expander, and terminate the upgrade process when the acquired attribute parameter information of the expander does not conform to the validity check information or the acquired version information of the expander does not conform to the version applicable-scope information.

In a specific implementation of the present disclosure, the fragment transmission module 303 is specifically configured to:

send the fragmented data only when it is determined that the expander is in the idle state until each data fragment is sent to the Expander, so that the expander receiving the firmware update data completes the update through the restart after receiving a restart command.

In a specific implementation of the present disclosure, the system further includes an incremental update module configured to:

generate a corresponding unique check value for each data fragment according to a preset algorithm;

acquire each unique check value stored during a previous out-of-band update of the Expander; and for each unique check value generated this time, when the unique check value is the same as any unique check value stored, cancel the sending of a data fragment corresponding to the unique check value and send event information to the Expander.

In a specific implementation of the present disclosure, the controller is connected to a plurality of Expanders, so as to update the connected Expanders in batches in a one-by-one update or broadcast update manner after the firmware update data is received.

It is to be further noted that the relational terms herein such as first and second are used only to differentiate an entity or operation from another entity or operation, and do not require or imply any actual relationship or sequence between these entities or operations. Moreover, the terms "include", "comprise", and any other variations thereof are intended to cover a non-exclusive inclusion. Therefore, a process, method, article, or device that includes a series of elements not only includes such elements, but also includes other elements not specified expressly, or may include elements inherent to the process, method, article, or device. If no more limitations are made, an element limited by an expression "including a/an . . . " does not exclude other same elements existing in the process, method, article, or device that includes the element.

Those of ordinary skill in the art may be further aware that the units and algorithmic steps of the examples described in combination with the embodiments disclosed herein can be implemented by electronic hardware, computer software, or a combination thereof. To clearly describe the interchangeability between the hardware and the software, compositions and steps of each example have been generally described according to functions in the above descriptions. Whether these functions are performed by hardware or software depends on a specific application and design constraints of the technical solution. Those skilled in the art may use different methods to implement the described functions for each particular application, but it should not be considered that the implementation goes beyond the scope of the present disclosure. The principle and implementations of the present disclosure are illustrated herein with specific examples. The description about the embodiments is merely provided to help understand the technical solutions of the present disclosure and core ideas thereof. It is to be noted that those of ordinary skill in the art can also make improvements and modifications to the present disclosure without departing from the principle of the present disclosure. Such improvements and modifications also fall within the protection scope of the claims of the present disclosure.

What is claimed is:

1. An expander out-of-band update method, applied to a controller connected to an expander through a communication bus, the method comprising:
   receiving firmware update data sent by a user;
   fragmenting the firmware update data; and
   sending the fragmented data only when it is determined that the expander is in an idle state until each data fragment is sent to the expander, so that the expander receiving the firmware update data completes an update through a restart.

2. The expander out-of-band update method according to claim 1, wherein the step of sending the fragmented data only when the expander is in an idle state comprises:
   determining that the expander is in the idle state when continuous utilization of a CPU of the expander is lower than a first threshold, and sending the fragmented data only when it is determined that the expander is in the idle state.

3. The expander out-of-band update method according to claim 1, wherein the step of sending the fragmented data only when the expander is in an idle state comprises:
   determining that the expander is in the idle state when bus utilization of the communication bus is lower than a second threshold, and sending the fragmented data only when it is determined that the expander is in the idle state.

4. The expander out-of-band update method according to claim 1, wherein the step of fragmenting the firmware update data comprises:
   acquiring an average bus interval time, and determining a fragment size corresponding to the average bus interval time according to a preset corresponding relationship; and
   fragmenting the firmware update data, a size of each data fragment being equal to the determined fragment size;
   wherein the fragment size in the corresponding relationship is positively correlated with the average bus interval time.

5. The expander out-of-band update method according to claim 4, wherein the fragment size in the corresponding relationship is equal to a product of the average bus interval time and a data transmission rate of the communication bus.

6. The expander out-of-band update method according to claim 1, wherein the step of fragmenting the firmware update data comprises:
   acquiring an average bus interval time, and determining a fragment size corresponding to the currently acquired average bus interval time according to a preset corresponding relationship;
   updating the average bus interval time and the corresponding fragment size according to a preset first time interval; and
   fragmenting the firmware update data according to a preset second time interval, during each fragmentation, a size of the data fragment being equal to the currently determined fragment size;
   wherein the fragment size in the corresponding relationship is positively correlated with the average bus interval time.

7. The expander out-of-band update method according to claim 1, subsequent to the step of receiving firmware update data sent by a user, further comprising:
   acquiring an upgrade mode;
   performing the operation of fragmenting the firmware update data when the acquired upgrade mode is an idle upgrade mode; and
   performing an upgrade process based on continuous sending of the firmware update data when the acquired upgrade mode is a continuous upgrade mode.

8. The expander out-of-band update method according to claim 1, subsequent to the step of receiving firmware update data sent by a user, further comprising:
   compressing the received firmware update data; and
   correspondingly, the step of fragmenting the firmware update data comprising:
   fragmenting the compressed firmware update data.

9. The expander out-of-band update method according to claim 8, further comprising:
   adding a check value for each data fragment after fragmentation, so that the expander, after receiving any data fragment, feeds check failure of the data fragment back to the controller for resending the data fragment.

10. The expander out-of-band update method according to claim 1, wherein the firmware update data further carries integrity check information; and
    correspondingly, subsequent to the step of receiving firmware update data sent by a user, the method further comprises:
    checking the received firmware update data through the integrity check information, and terminating the upgrade process when the check fails.

11. The expander out-of-band update method according to claim 10, wherein the firmware update data further carries validity check information and version applicable-scope information; and
    correspondingly, subsequent to the step of receiving firmware update data sent by a user, the method further comprises:
    acquiring attribute parameter information and version information of the expander; and
    terminating the upgrade process when the acquired attribute parameter information of the expander does not conform to the validity check information or the acquired version information of the expander does not conform to the version applicable-scope information.

12. The expander out-of-band update method according to claim 1, wherein the step of sending the fragmented data only when it is determined that the expander is in an idle state until each data fragment is sent to the expander, so that the expander receiving the firmware update data completes an update through a restart comprises:

sending the fragmented data only when it is determined that the expander is in the idle state until each data fragment is sent to the expander, so that the expander receiving the firmware update data completes the update through the restart after receiving a restart command.

13. The expander out-of-band update method according to claim 1, subsequent to the step of fragmenting the firmware update data, further comprising:

generating a corresponding unique check value for each data fragment according to a preset algorithm;

acquiring each unique check value stored during a previous out-of-band update of the expander; and for each unique check value generated this time, when the unique check value is the same as any unique check value stored, canceling the sending of a data fragment corresponding to the unique check value and sending event information to the expander.

14. The expander out-of-band update method according to claim 1, wherein the controller is connected to a plurality of expanders, so as to update the connected expanders in batches in a one-by-one update or broadcast update manner after the firmware update data is received.

* * * * *